Oct. 6, 1931.  S. I. CORY  1,825,715

TELEGRAPH TRANSMISSION MEASURING SYSTEM

Filed Dec. 31, 1929

INVENTOR
S. I. Cory
BY
ATTORNEY

Patented Oct. 6, 1931

1,825,715

UNITED STATES PATENT OFFICE

SAMUEL I. CORY, OF TOWACO, NEW JERSEY, ASSIGNOR TO AMERICAN TELEPHONE AND TELEGRAPH COMPANY, A CORPORATION OF NEW YORK

TELEGRAPH TRANSMISSION MEASURING SYSTEM

Application filed December 31, 1929. Serial No. 417,728.

This invention relates to telegraph transmission measuring systems, and particularly to a system for measuring bias of telegraph signals.

In the patent to Cory No. 1,628,392 that issued on May 10, 1927, there is disclosed an apparatus for measuring bias and total distortion of the impulses constituting a telegraph signal character. The arrangement therein shown for the measurement of bias was intended to be used to measure telegraph reversals of relatively high frequency such, for example, as fifteen dots per second. Since then it has been found desirable to employ a "2" signal in order to test the transmission characteristics of a telegraph circuit. A "2" signal is made up of five impulses, the first of which is of the same length as a dot, the second is equivalent to two dots, the third to five dots, and the fourth and fifth being each equal to the length of a dot. The spacing impulses of the last half of the signal correspond in length and position to the marking impulses of the first half of the signal and vice versa so that this signal is symmetrical. The "2" signal contains parts having a much lower frequency, and therefore, has fewer reversals than the dot signal heretofore employed. It has been found that the bias measuring circuit shown in the aforementioned patent while well adapted to measure a relatively high frequency current, such as that represented by the transmission of reversals at the rate of fifteen dots per second, is not well adapted for measuring signals containing low frequency components. such as are contained in the "2" signal.

This invention resides in means for readily measuring the amount of bias produced in telegraph signals containing parts of low frequency, as, for example, the "2" signal, as the result of their transmission over a telegraph circuit.

Figure 1:
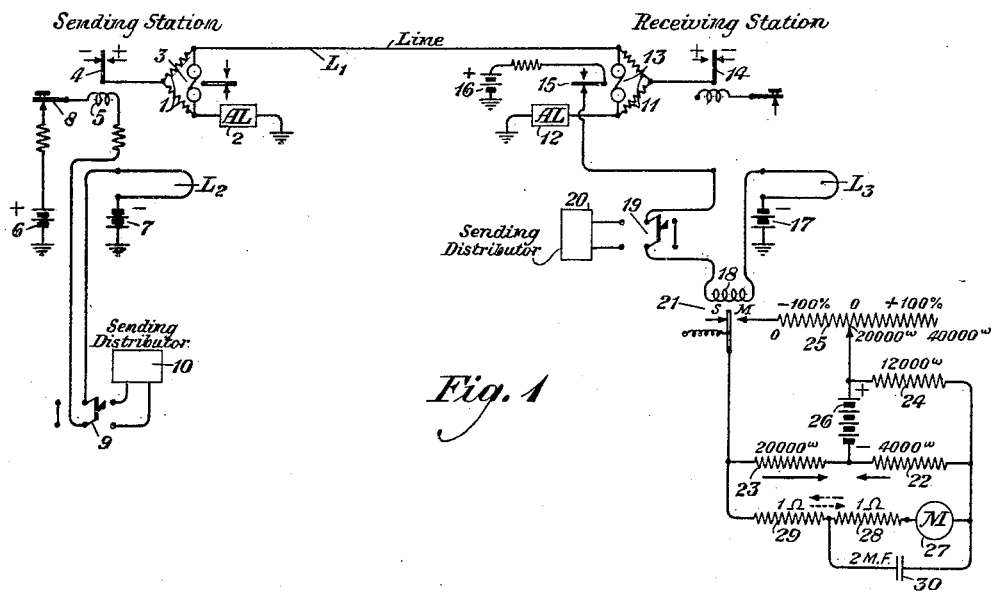
Figure 2:
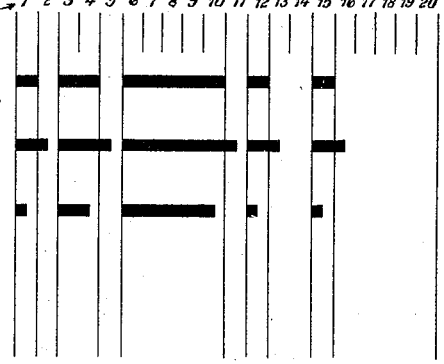

Other objects of the invention will be apparent from the following description when read in connection with the attached drawings, of which Figure 1 shows schematically the measuring circuit in connection with a telegraph circuit over which signals to be measured are transmitted, and Fig. 2 represents a "2" signal in its normal and biased forms, which figure serves to illustrate the description of the invention.

In Fig. 1, $L_1$ represents a line circuit having connected therewith not only the usual terminal apparatus for duplex or half duplex operation of the circuit but also apparatus for sending from one station to the other station a special signal, and for receiving and measuring the degree of bias of that signal. Since the apparatus for sending the special signal is at the left hand station and the apparatus for measuring bias is at the right hand station, the former has been designated a "sending station" and the latter a "receiving station", although it is to be understood that for commercial transmission each station receives and sends. At the "sending station" the line $L_1$ and the artificial line 2 are connected with the bridge arms 1—1, the junction point of which is connected with the armature 4 of the transmitting pole changer. Across the bridge arms a receiving relay 3 is connected. The winding 5 of the pole changer is connected in a circuit that includes the source of potential 6, the key 8, the arms of the switch 9 and a loop circuit to which is connected the source of potential 7. When the switch is thrown to the left the transmitting circuit is established for the normal transmission of signals. When the switch 9 is operated to the right the sending distributor 10 is connected into the transmitting circuit so as to effect the transmission of a predetermined signal, such, for example, as the "2" signal, by which that transmission characteristic of the line known as bias may be measured.

At the "receiving station" the line $L_1$ and the artificial line 12 are connected with the bridge arms 11, the junction point of which is connected with the armature 14 of the transmitting pole changer. Across the bridge arms are connected the windings of the receiving relay 13, which controls the transmission of the received signals to the loop $L_3$ and also to the bias measuring circuit, which will later be described. The armature 15 is connected with a source of potential 16, and the marking contact of relay 13 is connected with one of the arms of the switch 19, of which the other arm is connected with the winding 18 of the relay 21. The winding 18 is connected through the loop $L_3$ and the source of potential 17 to ground. When the switch 19 is operated to the right the receiving circuit at the "receiving station" is arranged for the reception of signals from the line $L_1$. When the switch 19 is operated to the left there is connected into the receiving circuit a sending distributor 20, which is a source of unbiased "2" signals. The device 20 constitutes simply a local standard by means of which the bias measuring circuit may be adjusted prior to the reception of the same signal from the line $L_1$, by which the magnitude of the bias is determined.

The bias measuring circuit is a Wheatstone bridge type of network comprising three fixed arms 22, 23 and 24 and a variable arm 25. The variable arm is connected with the marking contact of relay 21, and the fixed arm 23 is connected with the armature thereof. A source of potential 26 is connected across the network between the junction of arms 24 and 25 and the junction of arms 22 and 23. The indicating branch of the network includes a galvanometer 27 in series with two resistances 28 and 29, which are of the order of magnitude of one megohm each. A condenser 30 is connected across the meter 27 and one of the high resistances. The indicating branch is connected across the other two corners of the bridge, namely, between the junction of arms 22 and 24 and the junction of arms 23 and 25.

For clearness of disclosure of the invention, figures representing the preferred magnitudes of the various elements of the circuit have been shown, but it is to be understood that the invention is not limited to an arrangement employing elements of the size shown. It is important, however, that a certain proportioning of the parts shall be maintained in order to insure accuracy of measurement. For the purpose of describing the invention we will use the magnitudes represented on the drawing.

Since the arms 22 and 24 are in series with the source of potential 26, current will flow through them and the drop in potential through the arm 22 will be one-quarter of the total drop through the two arms. The direction of the drop through arm 22, and its magnitude are shown by the solid arrow. It will also be seen that arms 23 and 25 are in series with the source of potential 26 when the armature of relay 21 is on its marking contact. Current will accordingly flow through arm 23, and the drop in potential will be in the direction represented by the solid arrow. When the contactor of the variable resistance of arm 25 is upon its midpoint the resistance of that arm will be 20,000 ohms, which is the same as the resistance of arm 23. The drop in potential, therefore, through arm 23 will be one-half of the voltage of the source 26, as indicated by the magnitude of the arrow associated with 23. Since the drop through arm 22 is opposite to that through arm 23, there will be a resultant voltage in the direction represented by the arrow associated with 23, whenever the armature of relay 21 is on its marking contact, and the magnitude of that resultant voltage will be one-quarter of the voltage of the source 26. That resultant voltage is impressed, as indicated by the dotted arrow, across the indicating branch containing the center zero meter 27 in series with the high resistances 28 and 29, and it will tend to cause a flow of current through the said meter. When the armature of relay 21 is upon its spacing contact, the drop in potential through arm 23 vanishes, and the resultant voltage that acts upon the indicating branch is made up solely of the drop in potential through arm 22 alone, which drop in potential is opposite in direction to the resultant potential that was impressed upon the indicating branch when the armature 21 rested upon its marking contact and it is indicated by the dot and dash arrow. It therefore follows that when the armature of 21 is on its spacing contact the current flowing through meter 27 will be opposite in direction but equal in magnitude to that flowing through the meter when the armature of relay 21 is on its marking contact, assuming, of course, that the contactor of the variable resistance constituting arm 25 is at its midpoint.

Having in mind the description of the apparatus and the functions performed thereby, the invention will be made clear by describing the mode of operation of the circuit and apparatus in order to measure the percentage bias of a predetermined signal, such as the "2" signal. In order to do this the switch 19 is operated to the left, to connect into the receiving circuit the sending distributor 20 which serves to open and close the said receiving circuit in such a manner as to cause impulses of current to flow through the winding 18 of relay 21, which impulses are as represented in the upper line of Fig. 2 showing an unbiased "2" signal. The opening and closing of the circuit that includes the winding 18 of relay 21 will cause the armature of that relay to move from its marking to its spacing contact and vice versa. During such movement of the armature of relay 21 in accordance with the undistorted signals produced by the device 20, the measuring circuit is adjusted. This is effected by setting the contactor of the arm 25 at its midpoint which, assuming the magnitudes of the resistances shown in the drawing, indicates that 20,000 ohms are each side of that position of the contactor. The spring tension of the armature of relay 21 or the magnetic air gap should be adjusted until the needle of the galvanometer 27 vibrates about the zero point, indicating that on the average the armature of relay 21 rests upon the marking contact for the same length of time as it is away from the marking contact which is the condition for unbiased signals repeated from the armature of the relay.

Having adjusted the measuring set for the reception of undistorted signals, the switch 19 is thrown to the right so as to disconnect the local source of signals 20, and permit relay 21 to be affected by signals received from the line $L_1$. At the same time the switch 9 at the "sending station" is thrown to the right in order to connect the sending distributor 10 into the sending circuit at that station whereby a predetermined signal, such as the "2" signal, will be transmitted over the line $L_1$ and will be impressed upon relay 21 by the operation of the receiving relay 13 at the "receiving station".

If the signals received from the line $L_1$ are biased, the indication of the meter 27 at the "receiving station" will no longer be zero because the voltage drop across arm 23 will be increased or decreased from that with unbiased signals, depending upon whether the bias is positive or negative. Let us assume the case represented by (b) of Fig. 2, representing the "2" signal with 50 per cent marking bias. As will be seen from that figure, each of the marks of the signal is increased by 50 percent of the length of the unit mark. Since there are ten marking segments in the signal and only five of the 50 percent increments, the average increase in the marking time will be one-half of 50 or 25 percent. Therefore, in order to restore the needle of the meter 27 to zero it is necessary to reduce the voltage drop across the arm 23 by 20 percent. As resistance 25 is in series with resistance 23 and the source 26, the voltage drop across 23 may be reduced by the required 20 percent by increasing resistance 25 by 50 percent or from 20,000 to 30,000 ohms. In the case of 50 percent spacing bias, such as is represented by (c) of Fig. 2, the meter 27 may be restored to its zero indication by moving the contactor of the variable resistance of arm 25 in the direction to reduce the amount of variable resistance that is connected in series with the arm 23 when the armature is on its marking contact. For 50 percent spacing bias the resistance of arm 25 must be reduced by 50 percent from its setting for unbiased signals, that is to say, the contactor would have to be placed at the point where 10,000 ohms would be connected in series with the arm 23 in order to restore the needle of meter 27 to zero. Thus the percentage change in resistance 25 necessary to restore the meter indication to zero corresponds to the percentage bias of the received "2" signal. The variable resistance 25 may be provided with a scale marked to indicate zero percent bias at the center of the resistance and −100 percent and +100 percent at the ends as indicated by Fig. 1. As 5 percent steps are generally considered sufficiently close the variable resistance 25 may be built up of units which are 5 percent of the value of the resistance 25 in circuit when the arm rests at the zero percent point. In the case illustrated, this value is 20,000 ohms so that each step is 1,000 ohms. This fixed calibration is, of course, not affected by the potential of battery 26, or the speed of the received signals once the relay 21 has been adjusted as described above.

In the type of bias measuring circuit shown there is a slight effect upon accuracy due to the shunting effect upon the arms 22 and 23 of 4,000 and 20,000 ohms respectively, of the indicating branch circuit containing the meter 27. However, the meter circuit is of very high impedance so that the error is practically negligible, being somewhat less than one percent of the percentage bias. With a meter circuit of such high impedance sufficient damping for a satisfactory meter indication may be obtained without employing large values of capacity. Since the physical dimensions of a condenser are somewhat proportional to the capacity thereof, it is important to keep the capacity low so that the physical dimensions of the testing apparatus in which the condenser is employed may also be kept small. In the circuit shown in Fig. 1 the time required for the needle of the galvanometer to come to rest after the battery is connected to the circuit is in the order of seven seconds. The damping afforded by the bias testing circuit just described, is such as to afford practically a steady reading when measuring bias with the "2" signal.

While the invention has been described as embodied in a particular form and as having definite values assigned to the parts thereof, it is to be understood that the invention is not so limited but is capable of being embodied in other forms and as having different values without departing from the spirit and scope of the appended claims.

What is claimed is:

1. In a system for measuring bias of telegraph signals, the combination with a source of such signals of a relay connected therewith, having an armature and a contact, a network comprising a plurality of resistances connected with said armature and contact, a source of potential and a galvanometer, the said source of potential and said galvanometer being so connected with said resistances and the magnitudes being so chosen that the voltages impressed across said galvanometer during the reception of a mark will be equal and opposite to that applied during a space for unbiased signals.

2. In a system for measuring bias of telegraph signals, the combination with a source of such signals, of a relay having its armature responsive to the said signals, a Wheatstone bridge network having a source of potential connected between two of the opposite corners of the said network and having an indicating circuit including a galvanometer connected across the other opposite corners thereof, the said network being made up of three fixed resistances $a$, $b$, $c$ and a variable resistance $d$, resistances $a$ and $c$ being in series with each other and bridged across said source of potential, and resistances $b$ and $d$ being so connected with the armature and contact of said relay as to be connected in series with each other upon the operation of said relay and thereby to be bridged across said source of potential.

3. In a system for measuring bias of telegraph signals, the combination with a source of such signals, of a relay having its armature responsive to the said signals, a Wheatstone bridge network comprising a plurality of resistances $a$, $b$, $c$ and $d$, each constituting an arm of the said network, resistances $a$ and $c$ being in series with each other and bridged across a source of potential, the magnitude of $a$ being one-fourth of the sum of $a$ and $c$, resistances $b$ and $d$ being so arranged as to be serially connected upon the operation of the relay and bridged across the said source of potential the magnitude of resistance $b$ being equal to that of resistance $d$ for unbiased signals.

4. In a system for measuring bias of telegraph signals, the combination with a source of such signals, of a relay connected therewith having an armature responsive to the said signals, a Wheatstone bridge network comprising a plurality of arms $a$, $b$, $c$ and $d$, arm $a$ being equal in magnitude to one-fourth of $a+c$ and arm $b$ being equal in magnitude to one-half of $d$ when unbiased signals are effecting the operation of the said relay, a source of potential connected between the junction point of $a$ and $b$ and the junction point of $c$ and $d$, and an indicating circuit connected between the junction points of said arms representing the other two corners of said network.

5. In a system for measuring bias of telegraph signals, the combination with a source of such signals, of a relay having an armature responsive to said signals, a Wheatstone bridge network having a source of potential connected between two of the opposite corners of said network and having an indicating circuit connected across the other two opposite corners thereof, two of said arms being made up of 4,000 ohm and 12,000 ohm resistances, in series with each other and bridged across said source of potential, the other two arms of said network comprising a resistance of 20,000 ohms and a resistance variable from zero to 40,000 ohms, the said latter resistances being connected with the armature and a contact of the said relay connected with said source of signals so that the said latter resistances will be serially connected when said relay is operated, the said indicating circuit including a galvanometer in series with a high impedance of the order of two megohms and a condenser of the order of two microfarads bridged across said meter and part of said high impedance.

In testimony whereof, I have signed my name to this specification this 30th day of December, 1929.

SAMUEL I. CORY.